United States Patent
Hatteland

[19]
[11] Patent Number: 5,668,775
[45] Date of Patent: Sep. 16, 1997

[54] METHODS FOR DETERMINING THE POSITION OF SEISMIC EQUIPMENT, AND APPLICATIONS OF THE METHODS

[75] Inventor: Kjell Hatteland, Røyken, Norway

[73] Assignee: GECO A.S., Stavanger, Norway

[21] Appl. No.: 492,010

[22] PCT Filed: Nov. 18, 1994

[86] PCT No.: PCT/NO94/00186
§ 371 Date: Sep. 11, 1995
§ 102(e) Date: Sep. 11, 1995

[87] PCT Pub. No.: WO95/14246
PCT Pub. Date: May 26, 1995

[30] Foreign Application Priority Data

Nov. 19, 1993 [NO] Norway ................................ 934208

[51] Int. Cl.$^6$ .................................................. G01V 1/38
[52] U.S. Cl. ........................ 367/19; 367/127; 367/129; 367/130
[58] Field of Search .......................... 367/19, 127, 129, 367/130

[56] References Cited

U.S. PATENT DOCUMENTS

| 4,187,492 | 2/1980 | Delignieres | 367/127 |
| 4,376,301 | 3/1983 | Roberts | 367/19 |
| 4,845,686 | 7/1989 | Brac | 367/130 |
| 4,912,682 | 3/1990 | Norton, Jr. | 367/19 |
| 4,951,263 | 8/1990 | Shope | 367/2 |
| 5,136,613 | 8/1992 | Dumestre, III | 367/1 |
| 5,166,905 | 11/1992 | Currie | 367/19 |
| 5,353,223 | 10/1994 | Norton et al. | 367/19 |

Primary Examiner—Ian J. Lobo
Attorney, Agent, or Firm—Jacobson, Price, Holman & Stern, PLLC

[57] ABSTRACT

A method for determining the position of seismic equipment wherein acoustic transmitters transmit spread spectrum sequences which are received by the seismic sensors in the equipment whose position has to be determined. By collecting and processing the signals thus produced, it is possible to determine the position of seismic equipment with reference to each individual sensor in the seismic equipment each time a measurement is take. The already existing conventional seismic sensors which are provided in a streamer are used to record the transmitted spread spectrum signals. By calculating time differences between the sensors' reception of a spread spectrum signal it is possible to calculate the position of the seismic equipment.

13 Claims, 5 Drawing Sheets

METHODS FOR DETERMINING THE POSITION OF SEISMIC EQUIPMENT, AND APPLICATIONS OF THE METHODS

BACKGROUND OF THE INVENTION

The invention concerns a method for determining the position of seismic equipment, especially seismic sources and seismic streamers, wherein the seismic equipment is adapted to transmit and receive acoustic signals in a seismic frequency range. The invention also concerns an application of the method.

Seismic surveys can be conducted at sea, on shore or in zones between sea and shore, e.g. in shallow bays, in swampy areas and the like. A common feature of the surveys is that a seismic signal is transmitted from a source suited to the purpose and this signal is reflected by the ground formation and proceeds to be intercepted by seismic sensors. The signals are transmitted to an appropriate receiver station, where these data are processed and stored, to be used finally for constructing structural maps of the rock formations. These maps facilitate the process of assessing the probability of the existence of oil or gas in the surveyed area.

In marine surveys where it is the seabed which has to be surveyed, a typical seismic tow will consist of one or more sources and one or more cables, also called streamers. The actual towing is performed by one or more vessels. The seismic equipment towed behind the vessels is usually submerged in the water, the sources at a depth of roughly 5 to 10 meters, and the streamers at roughly 5 to 30 meters. A streamer generally extends to a length of from a few hundred meters to several thousand meters, although a length of 3,000 meters is usual. Inside the streamer which has a diameter of approximately 6 centimeters there are located a large number of sensors, also called hydrophones. A source usually consists of several suitable sonic guns, e.g. airguns which are arranged in a row or in a group. This is also called a gun array. A gun array is normally from 10 to 30 meters in length. When airguns are used, the guns are filled with compressed air, this air being released at a given time, thereby forming the seismic pulse. This is also called a seismic shot or a shotpoint. It is this pulse which, after having been reflected, is intercepted by sensors in the seismic streamer. In a streamer of approximately 3,000 meters there can be from several hundred to over a thousand groups consisting of one or more sensors. This means that the groups are situated close to one another. The normal procedure is to record data concerning the ground formation every 25 meters, and with a density in the tow's width direction of from 50 to 200 meters. The signals received by the hydrophones are transmitted analogically or digitally to a receiver station via the streamer's system of transmission lines. In the receiver system the signals are processed in the desired manner. The processing of data is performed by means of a computer program and algorithms suited to the purpose.

One of the prerequisites for obtaining the best possible result from a seismic survey is to have a method for determining the position of the seismic equipment which can provide as correct an image of the equipment's positions as possible.

On the basis of the prior art in this area, reference can be made to several methods for positioning the seismic equipment. One known method is the use of magnetic compasses in order to determine position. Magnetic compasses are attached at regular intervals, e.g. every 400 meters, along the streamer, generally with slightly closer spacing in the first and last pads of the streamer. By noting the compass readings and processing these data a determination can be made of the streamer's orientation at the point where the compass is attached to the streamer. An estimate of the streamer position must be made for that pad of the streamer which lies between the compasses. This method has several drawbacks. The magnetic compasses attached to a streamer have been found to give some doubtful readings. They are expensive to purchase. Since they are attached to the outside of the streamer they are liable to fall off. Another problem is that the actual compasses may be wrongly calibrated, thus giving misleading readings. In bad weather with high seas the compass reading may be found to give incorrect values. Even in weather conditions with a calm sea the compasses and the streamer will be exposed to movements from the sea, and a compass reading will therefore always involve some degree of uncertainty.

Another method has been the use of acoustic transmitters and receivers, also called transponders, located on the equipment, generally both on the streamers and the sources. The acoustic transmitters transmit ultrasound, which is recorded and possibly transmitted back by corresponding transponders which are attached to the equipment. The transponders are normally attached to the foremost and hindmost pads of the streamer in order to obtain the best possible information concerning the positions of a streamer and a gun array in this area. Once again compass readings have to be relied upon for the rest of the streamer. The main reason why acoustic transponders are not attached along the rest of the streamer is that it will be too expensive. To have a great deal of equipment suspended from the streamer will cause unnecessary noise, it will naturally take more time to deploy all the equipment, and the chances of losing valuable equipment will increase. In addition complicated computer programs are required in order to process and calculate a streamer's position on the basis of a complicated set-up with information from transponders and compass.

Yet another known method is the employment of surface positioning, where use is made of satellite receivers, e.g. GPS receivers (Global Positioning System). A method of this kind will normally employ GPS receivers on the streamers' end buoys in addition to the satellite receiver on the vessel. GPS receivers may also be placed on the floats of the gun arrays. By means of radio telemetry, communication is obtained between the various GPS receivers and the system on the vessel. The weakness with such a method is, of course, that the streamers are substantially submerged in water, thus making surface positioning impossible. Even though the method will give a good result for the position of the streamers and possibly the gun arrays, where it is possible to utilize surface positioning, i.e. for the foremost part of the streamers and for the streamers' end buoys, there will only be the compass readings to depend on for the main part of the streamers, which is submerged in water. In addition it is an expensive and complex manner of acquiring information on the position of the equipment.

A combination of the above methods is perhaps that which is most commonly used today. By employing surface positioning, acoustic positioning equipment such as ultrasound-based transponders on the foremost and hindmost parts of the streamer, and finally readings of magnetic compasses attached along the streamer, the positions of the seismic equipment are determined. It is clear to see that this is a very complicated method, as well as an expensive one. The drawbacks already described will also apply to this method.

U.S. Pat. No. 5,136,613 discloses a method for acoustic communication between transponders which on a given signal transmit ultrasound signals for use in acoustic positioning. The method employs the technique of spread spectrum, but nevertheless is different from the present invention, since ultrasound signals are employed here, and it is the same type of transponders which also receive the signals. A frequency multiplex system is described, in which combinations of bit pairs (00, 01, 10, 11) are encoded as predefined ultrasound frequencies. This differs from the present invention where orthogonal spread spectrum codes are used in the seismic frequency range.

U.S. Pat. No. 4,951,263 discloses a method for localizing objects under water or on the seabed, where a spread spectrum technique is used. Equipment which has to be localized may be, e.g., unexploded torpedoes, etc. Spread spectrum coding is used in order to improve the penetration capacity of the transmitter signal and to prevent undesirable localizing of the transmitter.

SUMMARY OF THE INVENTION

The object of the present invention is to provide an improved determination of the position of seismic equipment. With the present method an almost optimum determination is obtained of the position of the seismic equipment. This is achieved in addition to a reduction in costs in relation to the costs in the prior art, and a simplification of the equipment required for positioning and locating such equipment.

This is achieved according to the invention by generating a spread spectrum signal as an orthogonally encoded signal sequence and with an unambiguous top in the signal's autocorrelation function, by transmitting the generated spread spectrum signal, acoustic transmitters provided in the seismic equipment being used for transmitting the spread spectrum signal, by detecting the transmitted spread spectrum signal, acoustic receivers being provided in the seismic equipment and adapted for the detection of the spread spectrum signals in the frequency range being used, by cross-correlating the detected spread spectrum signal with the transmitted spread spectrum signal's orthogonal code, by determining a time difference between the detection of the received spread spectrum signal in the acoustic receivers on the basis of the unambiguous top in the received spread spectrum signal's cross-correlation function, by determining the distance between the individual acoustic transmitters and the individual acoustic receivers which are provided in the seismic equipment on the basis of the determined time difference and a given distance between the acoustic receivers, and by forming on the basis of the determined distance a spatial network which gives the seismic equipment's geometrical configuration, the location of one or more points in the network being given by relating the network to one or more conventionally determined geographical positions.

The acoustic transmitters are arranged on the outside of the streamers, inside the streamers, on floats or on ROV's (Remotely Operated Vehicle), which are subsea vehicles.

The transmitters are spaced along the streamers at intervals of preferably from 150 to 300 meters.

The transmitters transmit their signals on command.

The acoustic receivers or the seismic sensors used to record the transmitted spread spectrum signals are conventional seismic sensors which are already located in the streamers in order to record the seismic signals.

One or more sensors simultaneously record the transmitted spread spectrum signal. The transmitted signal is recorded either during the actual recording of the shot or between the shotpoint recordings.

The time of the transmission of the spread spectrum signal is not synchronized with other seismic events, e.g. shotpoint.

The transmission code for the transmitted signals can be altered for each shotpoint. Surface positioning can be implemented as a supplement to the present invention. The present invention is employed in seismic surveys with a multistreamer-multisource arrangement. Positioning of seismic equipment is also achieved with the use of a single receiver.

An exemplary method for determining the position of seismic equipment using a single receiver, wherein the seismic equipment is arranged to transmit and receive acoustic signals in a seismic frequency range, comprises the steps of: generating a spread spectrum signal as an orthogonally encoded signal sequence and with an unambiguous top in the signal's auto correlation function; transmitting the generated spread spectrum signal, at least one acoustic transmitter provided in the seismic equipment being used for the transmission of the spread spectrum signal; detecting the transmitted spread spectrum signal, one single acoustic receiver provided in the seismic equipment being adapted for the detection of the spread spectrum signal; cross-correlating the detected spread spectrum signal with the transmitted spread spectrum signal's orthogonal code; determining the time of the detection of the received spread spectrum signal in the single acoustic receiver on the basis of an unambiguous top in the received spread spectrum signal's cross-correlation function, the detection time being synchronized in relation to the time of the transmission of the spread spectrum signal, determining the distance between the acoustic transmitter(s) and the single acoustic receiver which is provided in the seismic equipment on the basis of the difference between the detection time and the transmission time for the spread spectrum signal, the location of the acoustic receiver being given by the fact that the location of one or more of the acoustic transmitters is related to one or more conventionally determined geographical positions. Preferably, the fixed time scale is obtained by connecting the acoustic transmitter or the acoustic transmitters and the single acoustic receiver with a clock, the clock being capable in a per se known manner of being controlled by a time signal which synchronizes the clock with an absolute time scale.

Preferably, the method is used for determining the position of seismic equipment consisting of stationary acoustic receivers.

BRIEF DESCRIPTION OF THE DRAWINGS

The method according to the invention is illustrated in the drawing, in which.

DESCRIPTION OF THE PREFERRED EMBODIMENTS

Figure 1A:
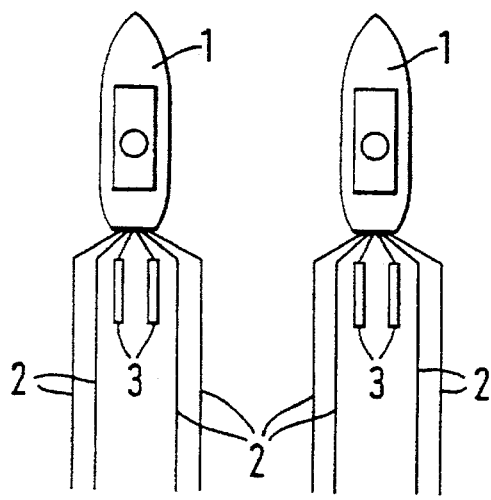
FIGS. 1a and 1b are general views of a marine seismic tow including the vessels.
Figure 1B:
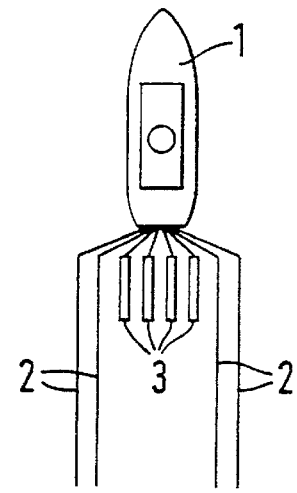

FIG. 1a illustrates a typical two-vessel 1 marine seismic tow consisting of eight streamers 2 and four gun arrays 3 altogether. The two vessels operate together, and thus it is important for them to have the best possible method for determining the position of the seismic equipment. FIG. 1b illustrates a seismic tow consisting of four streamers 20 and four gun arrays 3, the tow being performed by one vessel 1.

Figure 2:
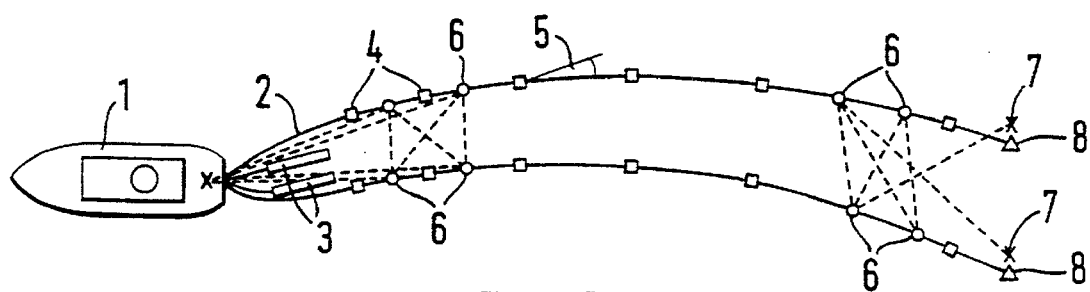
FIG. 2 is a general view of a marine seismic tow in which the prior art is employed.

FIG. 2 illustrates the prior art wherein a typical marine seismic tow consists of two streamers 2 and two sources 3. A plurality of direction indicators or magnetic compasses 4 are located along the streamers 2. By reading the compasses an angle φ5 will be obtained which will be the angle between the streamer's direction at the reading point and the earth's horizontal magnetic field. Acoustic transponders 6 are placed on the streamers' foremost and hindmost parts, generally two transponders in front and two transponders at the back. The distance between two transponders may be from 200 to 400 meters. By attaching a satellite receiver 7 to the end buoy 8 and on to the vessel 1 and setting up a radio telemetry system to the vessel it is possible to obtain an exact determination of the vessel's position as well as the position of the end buoy. In addition to this transponders and possibly a satellite receiver, e.g. a GPS receiver 7 could also have been implemented on a gun array 3 in order to find the position of the array 3. By collecting the information obtained from compass readings 4, transponders 6 and satellite receivers 7, an estimate of streamer and source positions can be made by means of conventional methods for distance calculations.

Figure 3A:
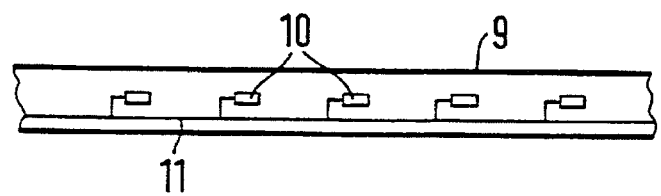
FIG. 3a is a general view of a streamer section and its sensors.

FIG. 3a is a side view of a part or a section 9 of a streamer. A section is usually 100 meters long, and has contacts at both ends for joining it to other sections. The sensors or hydrophones 10 which are provided inside the streamer are pressure sensitive. A typical area for pressure stress within which the hydrophones operate, also called seismic band or seismic width, is from 3 Hz to half of the sampling frequency, or from 0 to 500 Hz. The signals intercepted are transmitted via the streamer's system of transmission lines 11 to a receiver station on board the vessel. Several hydrophones form a group. The distance between the groups may be from 6 to 25 meters, but a group spacing of 12.5 meters is often employed. The sensors record the seismic signal, but they can also record any signal which lies within the sensors' frequency range. This is important with regard to the present invention. Thus already existing sensors are employed in order to obtain information which is necessary in order to determine the position of the same equipment. This means that the present invention is not dependent on compass measurements. The only new item which requires to be added to the equipment which has to be positioned is the acoustic transmitters. Since there are already lines connecting the sensors and the receiver equipment, as well as command lines, it is not necessary to provide a new system of transmission lines.

Figure 3B:
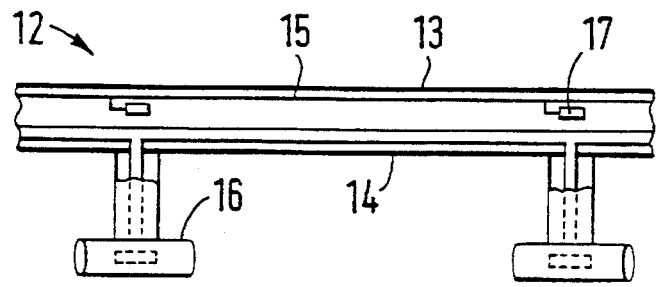
FIG. 3b is a general view of a gun array and its sensors.

FIG. 3b is a side view of a part of a gun array 12. It consists of a streamer 13 which contains air hoses 14 and a system of transmission lines 15 for communication between a gun control unit and the actual guns 16. In addition hydrophones are installed, usually called near field hydrophones 17 at each gun. These hydrophones transfer the signals via the system of transmission lines 15 in the gun cable 13. Thus it is possible to intercept signals from a transmitter with hydrophones which are located in the gun array. Once again an essential feature of the present invention is that existing sensors are used to record signals from the transmitters.

Figure 4:
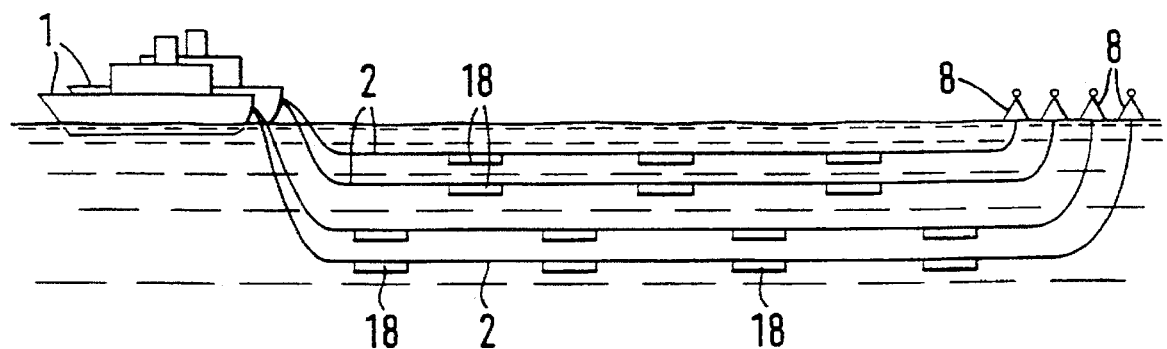
FIG. 4 is a general view of a marine seismic tow in which transmitters are provided on the streamers.

FIG. 4 illustrates how the transmitters 18 are located in a marine seismic tow. These transmitters 18 are deployed at intervals of approximately 150 meters. The transmitters 18 are conventional underwater audioacoustic transmitters. The principal requirement of the transmitters is that they should be capable of transmitting a signal which is sufficiently strong to be able to be received several hundred meters from the transmitter and that the signals or codes which are transmitted also contain frequency components which lie within the frequency band, which the hydrophones are capable of detecting.

Figure 5:
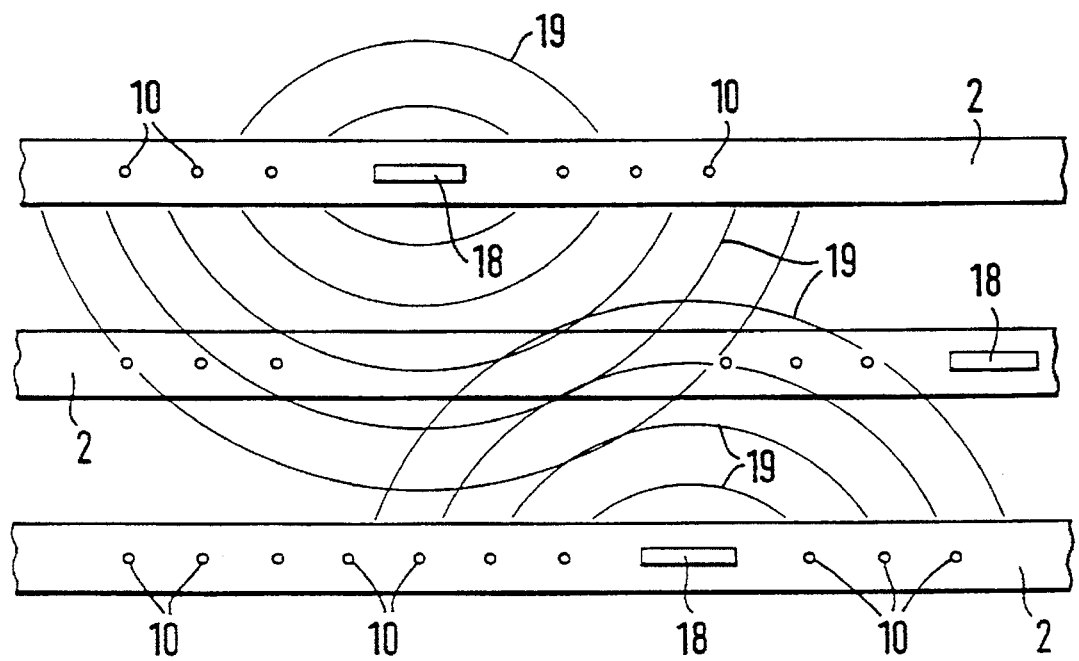
FIG. 5 is a general view of a section of the streamers with transmitters and sensors included.

The closer together the transmitters are placed the better the resolution which is obtained. In the figure the transmitters are shown suspended on the streamer, i.e. they are located on the outside of the actual streamer 2. The transmitters can also be built into the streamer as illustrated in FIG. 5. This will be preferable since they will receive far better protection. It is also possible to provide the transmitters on buoys, vessels or ROV's (Remotely Operated Vehicle) which are subsea vehicles.

FIG. 5 is a section of a tow consisting amongst other things of three streamers 2. It can be seen in this figure that the transmitters 18 are built into the streamer 2. The transmitters 18 transmit spread spectrum signals which are unique acoustic signals 19 which lie within a frequency band that the hydrophones are capable of detecting. The signals are intercepted by the conventional seismic sensors 10 which are already located in the cables 2, either in the streamers or in the gun array cables. By using the existing sensors in the streamers a far better resolution will be obtained than that achieved by means of the prior art.

The transmitters will transmit a signal on command. The sensors will intercept the signal and transmit it on board the vessel for processing and storing. There is no rule governing when the codes from the spread spectrum transmitters should be recorded and this can be done during the normal recording time for a shot or also between each shotpoint. Seismic signals are normally recorded and stored during a period of 4 to 12 seconds after a shot has been fired. The signals from the transmitters can be recorded when wished, since there is no correlation between the seismic signal and the spread spectrum codes, i.e. it is not possible to confuse a seismic signal with a spread spectrum signal transmitted from a transmitter. Had a transmitter been used which transmitted signals on a specific frequency, this would cause them to be confused with seismic signals on the same frequency. Due to the signal-to-noise ratio the normal procedure will be to record the signals once per shot, and then usually record the measurement towards the end of the recording time when the seismic signal is weakest, or between the shotpoints.

The signals which are transmitted according to the present invention are so-called orthogonal spread spectrum signals. Spread spectrum techniques are described in the literature and well known by those skilled in the art. An ordinary modulation technique is based on the fact that the transmitted signal uses a certain part of the frequency band in a communication channel, e.g. by means of frequency modulation (FM) or amplitude modulation (AM). As distinct from this, in spread spectrum modulation the entire bandwidth in a communication channel will be used and split up a transmitted signal frequency, the individual parts being transferred on several different frequencies. Only the receiver will know which frequency and phase combination the incoming information will have. The receiver knows a transmitter's individual code. By cross-correlating the incoming signals with a transmitter's individual code, a receiver will be able to extract the unambiguous spread spectrum signal from the range of other signals. An n=t ∞cross-correlation function will be in the form $$r(\tau) = \sum_{n=-\infty}^{n=+\infty} \times (n) + y(n+\tau)x(n)^*y(n+\tau).$$

When a sequence is cross-correlated with itself the process is called autocorrelation.

The autocorrelation function of a series $x[\tau]$ will always have a certain top value for $\tau=0$, given by $r(0)=x_1^2+x_2^2+xn^2+x_n^2$. It is desirable for spread spectrum sequences which are used for positioning of seismic equipment to have an autocorrelation function which represents a "white noise" pattern apart from $\tau=0$. In order to avoid false detection of, e.g., signals which use the same communication line, the cross-correlation function between the codes must have a top value which is as low as possible.

Figure 8:
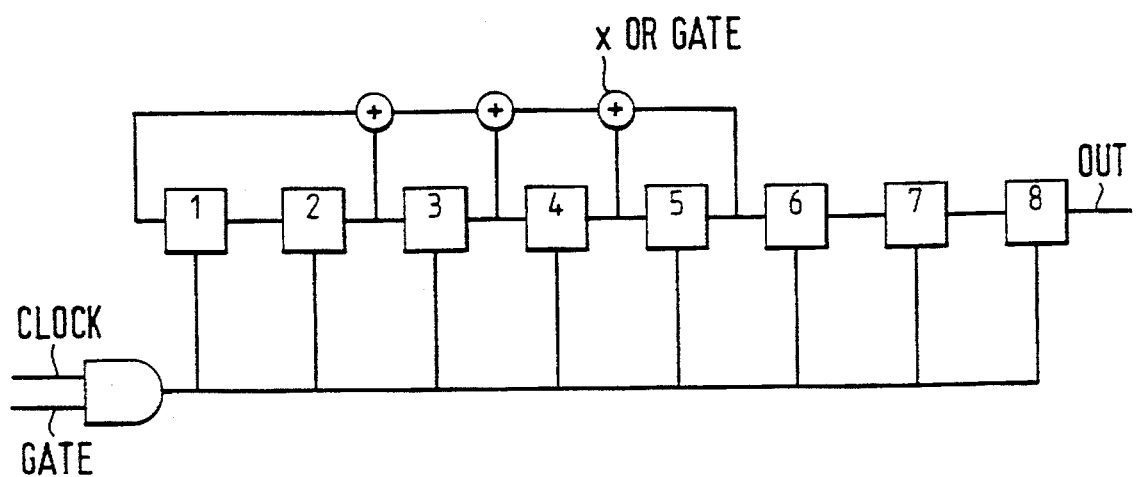
FIG. 8 is a representation of a "Gold" sequence.

The transmission pulse consists of a set of orthogonal pulses with an unambiguous top in their respective autocorrelation functions. Several conventional methods of generating such functions can be mentioned. Perhaps the most common method uses random sequence codes called Gold codes. This method provides a selection of codes which give low values in the cross-correlation function. These are generated by the use of shift registers of variable length with a special feedback pattern. When used in the present invention a register of this kind will normally look like that illustrated in FIG. 8. The figure is a representation of a Gold code [5,4,3,2]. The figure illustrates an eight bit serial shift register which will give a $2^8=256$ bit long sequence.

There are several methods for generating pseudorandom sequences, e.g. frequency hopping, frequency shift coding or phase coding. Regardless of which pseudorandom sequence is chosen, it is important for its autocorrelation function to have a distinct top value and for the cross-correlation to be as low as possible. Even with signal amplitudes down towards the signal amplitude for sea noise it will be possible to extract a correlation stop.

Even calculation of positions for the seismic equipment or the sensors can be performed in countless different and conventional ways depending on which parameters are known for the system and how the system is configured. The common feature of all the methods, however, is that the received signals according to the present invention have to be cross-correlated with the transmitting signal signature of the specific transmitters to which the absolute or relative distance requires to be determined. Further processing of data is performed according to the prior art.

The simplest case consists of a transmitter and a receiver where the system is designed in such a manner that accurate information is available as to when the transmitter transmits in relation to the receivers sampling points. After the above-mentioned cross-correlation a maximum value will be found in the cross-correlation function which indicates the absolute time difference between transmitter and receiver. It will be possible to develop this technique used on a streamer with several sensors in order to obtain an unambiguous geometrical network of distances and relative positions.

Another example is a streamer where one or more transmitters are provided beside it, and where the starting time for the transmission of the signals is not known to the receivers. After the above-mentioned cross-correlation of the receiver signals, the relative time difference between the maximum values in the cross-correlation function can be used for determination of position. This is done by using known principles employed in the field of "hyperbolic" positioning or "hyperbolic" navigation.

Figure 6:
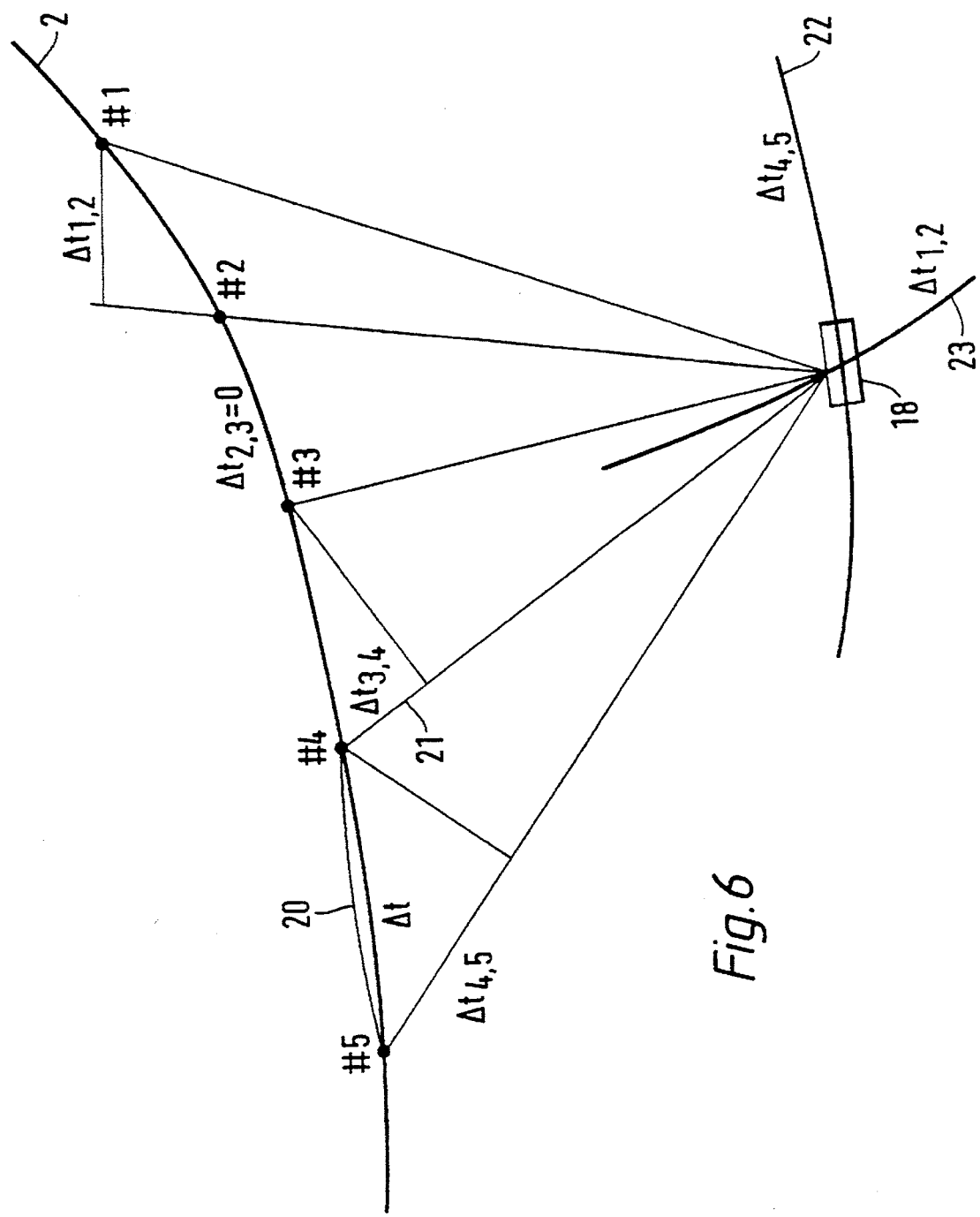
FIGS. 6 and 7 are general views of a possible method for the calculation of positions in a spread spectrum positioning system.
Figure 7:
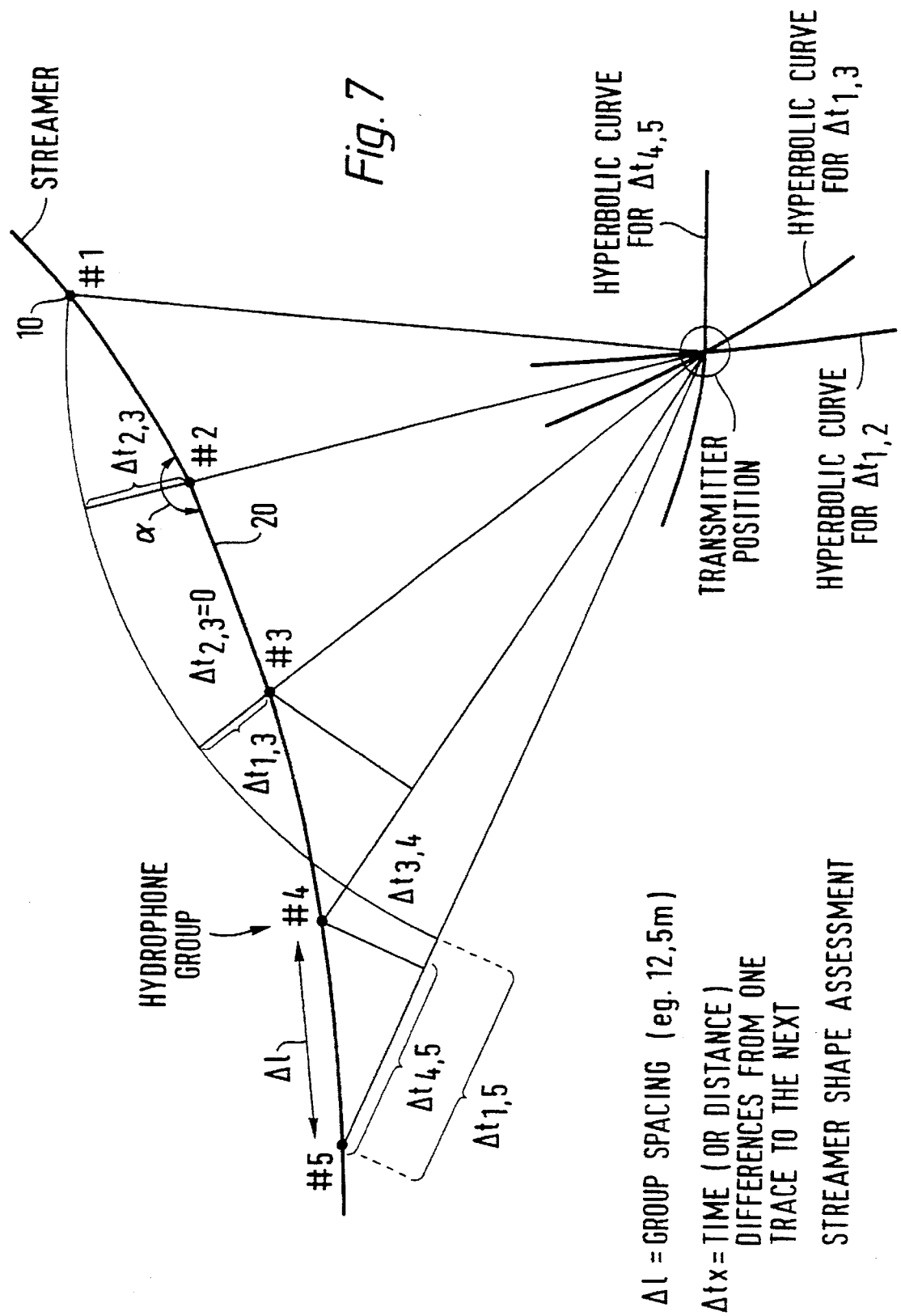

FIGS. 6 and 7 illustrate the theory behind a possible calculation method for determining the position of seismic equipment according to the invention. The term seismic equipment refers to streamers and gun arrays, even though only the theory for positioning streamers 2 is shown in the example. FIGS. 6 and 7 show a section of the streamer 2 and numbered hydrophone groups 10. In the figures hydrophone groups #1, #2, #3, #4 and #5 are presented with a group interval of $\Delta l=12.5$ meters 20. Furthermore the transmitter 18 is located at a certain distance from the streamer and transmits a spread spectrum signal 19 which is received by the hydrophone groups #1 to #5, etc., from where the signal is transmitted further for processing. According to the present invention this processing consists primarily in a cross-correlation with the signature of a given, transmitted signal sequence (sequence code). $\Delta tx_1$, $tx_2$ is the time difference between the top value of a cross-correlation function for two given hydrophone groups ($x_1$ and $x_2$) which receive signals from the transmitter. For example $\Delta t_{3,4}$ 21 is the time difference between hydrophone group #3 and hydrophone group #4. Based on the example in FIGS. 6 and 7 it can be seen that the time difference between hydrophone groups #2 and #3 is zero. In FIG. 6 hyperbolic curves are illustrated for $\Delta t_{4,5}$ 22 and $\Delta t_{1,2}$ 23. The hyperbolic curve indicates the geometrical point for the transmitter's position for given time differences. In groups #1, #2 and #3, for example, three different hyperbolic curves can be calculated, one for $\Delta t_{1,2}$, one for $\Delta t_{2,3}$ and a third for $\Delta t_{1,3}$. When the location for sensor group #3 is adjusted in relation to sensor groups #1 and #3, thus causing these curves to intersect each other at one point, the angle $\alpha$ between the axes #1, #2 and #2, #3 has been found. This method of finding relative positions is known and forms the basis for "hyperbolic" positioning. The distance between the receiver stations does not need to be equal to the group interval as in the case described, but can be adjusted to the positional accuracy and resolution which are desirable along the streamer.

With the method according to the invention it is not necessary to know the exact position of the transmitters, nor to synchronize the times for the transmission of signals from the transmitters. The actual calculation of time differences and the point of intersection for the hyperbolic curves, or in other words all calculations for determining the position of the seismic equipment will be performed by means of suitable software and algorithms suited to the purpose.

Several possible calculation methods for determining the position of seismic equipment will be able to fall within the scope of the present invention.

The present invention is used in seismic surveys in which a multistreamer-multisource arrangement is employed, but also for single receiver arrangements and stationary single or multiple receiver arrangements.

Figure 9:
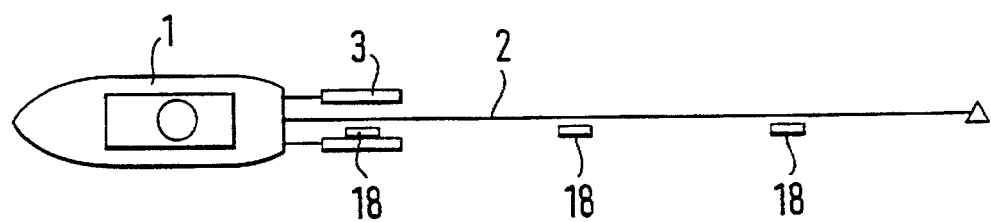
FIG. 9 is a general view of a single receiver system

FIG. 9 illustrates a marine seismic tow consisting of one streamer 2 and two gun arrays 3. This is to illustrate that the present invention can be used in cases where a single streamer is employed. In this case transmitters 18 must be used which are located beside the actual streamer 2. This can be done by attaching the transmitters to the gun arrays and in buoys, floats or ROV's which are located at the side of the streamer.

For systems or surveys using single receivers or stationary single receivers it is necessary to synchronize the transmitter and receiver. On the basis of the said cross-correlation technique, the absolute distance can thereby be found between the transmitter and the receiver by using signals intercepted by the existing seismic receiver.

1: vessel
2: streamer
3: source/gun array
4: compass
5: the angle φ
6: acoustic transponder
7: satellite receiver, e.g. GPS receiver
8: end buoy
9: section
10: sensor/hydrophone/group
11: system of transmission lines
12: part of a gun array
13: gun array cable
14: air hose
15: system of transmission lines for the gun cable
16: seismic gun
17: hydrophone in a gun array
18: acoustic transmitter
19: spread spectrum signal
20: group length $\Delta l$
21: delta time difference $\Delta t_{3,4}$
22: hyperbolic curve delta $\Delta t_{4,5}$
23: hyperbolic curve delta $\Delta t_{1,2}$
24: the angle α between two segments

I claim:

1. A method for determining the position of seismic equipment, especially seismic sources and seismic streamers, wherein the seismic equipment is arranged to transmit and receive acoustic signals, said method comprising the steps of: generating a spread spectrum signal having an orthogonally encoded signal sequence, said spread spectrum signal having a prominent peak in an autocorrelation function thereof; transmitting the spread spectrum signal using acoustic transmitters provided in the seismic equipment; detecting the spread spectrum signal transmitted by said acoustic transmitters using acoustic receivers in the seismic equipment and adapted for the detection of the spread spectrum signal; cross-correlating the spread spectrum signal detected by said acoustic receivers with the orthogonally encoded signal sequence of the spread spectrum signal; determining a time difference between detection of the spread spectrum signal received by said acoustic receivers on the basis of a prominent peak in a cross-correlation function of the spread spectrum signal as received by each acoustic receiver; determining a distance between said acoustic transmitters and said acoustic receivers on the basis of said time difference and a known distance between said acoustic receivers; and forming on the basis of the distance determined during said step of determining a distance, a spatial network indicative of the seismic equipment's exact geometrical configuration, the location of at least one point in said spatial network being defined by relating the network to at least one conventionally determined geographical position.

2. The method according to claim 1, wherein the spread spectrum signal is within a frequency range of approximately 1–1000 Hz.

3. The method according to claim 1 wherein the spread spectrum signal is transmitted in response to a given command.

4. The method according to claim 1, wherein the acoustic transmitters are provided at intervals of approximately 150–300 m.

5. The method according to claim 1, wherein said seismic sources transmit seismic signals, and wherein said acoustic receivers detect the seismic signals transmitted by the seismic sources.

6. The method according to claim 5, wherein the spread spectrum signal is simultaneously detected in at least two of said acoustic receivers.

7. The method according to claim 1, wherein the spread spectrum signal is transmitted at a random point in time.

8. The method according to claim 1, wherein the transmitted spread spectrum signal is synchronized relative to a given seismic event.

9. The method according to claim 7, wherein different orthogonal codes are used for individual spread spectrum signals, thus enabling the spread spectrum signals to be assigned to a given seismic event.

10. The method according to claim 1, wherein said method is carried out so as to determine the position of marine seismic equipment comprising at least two of said seismic sources and at least two of said seismic streamers.

11. A method for determining the position of seismic equipment, wherein the seismic equipment is arranged to transmit and receive acoustic signals, said method comprising the steps of: generating a spread spectrum signal having an orthogonally encoded signal sequence, said spread spectrum signal having a prominent peak in an autocorrelation function thereof; transmitting the spread spectrum signal using at least one acoustic transmitter provided in the seismic equipment; detecting the spread spectrum signal transmitted by said at least one acoustic transmitter using one single acoustic receiver in the seismic equipment and arranged for the detection of the spread spectrum signal; cross-correlating the spread spectrum signal detected by said acoustic receiver with the orthogonally encoded signal sequence of the spread spectrum signal; determining the exact time of the detection of the spread spectrum signal received by the acoustic receiver on the basis of a prominent peak in a cross-correlation function of the spread spectrum signal as received by the acoustic receiver, the time of detection being synchronized in relation to a time of transmission of the spread spectrum signal; determining a distance between said at least one acoustic transmitter and the acoustic receiver on the basis of the difference between detection of the spread spectrum signal and the time of transmission, the location of the acoustic receiver being defined by the fact that the location of said at least one acoustic transmitter is related to at least one conventionally determined geographical position.

12. The method according to claim 11, wherein synchronization is obtained by connecting said at least one acoustic transmitter and the acoustic receiver to a clock, the clock being controllable by a time signal which synchronizes the clock with an absolute time scale.

13. The method according to claim 11, wherein said method is carried out so as to determine the position of seismic equipment consisting of said acoustic receiver.

* * * * *